United States Patent
Ben Dror

[11] Patent Number: 5,900,003
[45] Date of Patent: May 4, 1999

[54] PAGE-MAKEUP SYSTEM

[75] Inventor: Yoav Ben Dror, Rehovot, Israel

[73] Assignee: Indigo N.V., Veldhoven, Netherlands

[21] Appl. No.: 08/592,376

[22] PCT Filed: Jul. 1, 1994

[86] PCT No.: PCT/NL94/00150

§ 371 Date: Mar. 8, 1996

§ 102(e) Date: Mar. 8, 1996

[87] PCT Pub. No.: WO95/02224

PCT Pub. Date: Jan. 19, 1995

[30] Foreign Application Priority Data

Jul. 9, 1993 [IL] Israel ....................................... 106297

[51] Int. Cl.⁶ ....................................................... G06F 3/12
[52] U.S. Cl. ........................................... 707/517; 707/522
[58] Field of Search .................................. 395/114, 115, 395/116, 117, 777, 779, 784, 133; 345/115, 116, 189, 192, 433; 707/515, 517, 522

[56] References Cited

U.S. PATENT DOCUMENTS

| | | | |
|---|---|---|---|
| 4,964,070 | 10/1990 | Markoff et al. .......................... | 395/102 |
| 5,018,083 | 5/1991 | Watanabe et al. ....................... | 395/779 |
| 5,142,620 | 8/1992 | Watanabe et al. ....................... | 395/508 |
| 5,146,554 | 9/1992 | Statt ......................................... | 358/456 |
| 5,251,022 | 10/1993 | Kitamura ................................. | 399/101 |
| 5,357,344 | 10/1994 | Kasamatsu et al. .................... | 358/298 |
| 5,465,322 | 11/1995 | Hsu et al. ................................ | 395/114 |
| 5,539,865 | 7/1996 | Gentile .................................... | 395/115 |
| 5,542,031 | 7/1996 | Douglass et al. ....................... | 395/114 |
| 5,592,593 | 1/1997 | Speed ...................................... | 395/110 |
| 5,604,847 | 2/1997 | Dennis et al. ........................... | 395/116 |
| 5,621,543 | 4/1997 | Oomoto ................................... | 358/456 |
| 5,715,382 | 2/1998 | Herregods et al. ..................... | 395/117 |

FOREIGN PATENT DOCUMENTS

| | | |
|---|---|---|
| 0381298 | 8/1990 | European Pat. Off. . |
| 0431638 | 6/1991 | European Pat. Off. . |
| 9221097 | 11/1992 | WIPO . |

OTHER PUBLICATIONS

Patent Abstract of Japan, vol. 15, No. 5 (P–1149), Dec. 10, 1990.

*Primary Examiner*—Stephen S. Hong
*Attorney, Agent, or Firm*—Greenblum & Bernstein P.L.C.

[57] ABSTRACT

Page make-up method which includes providing a plurality of uniquely identified sub-pages, comprising half-toned images, in a memory, and organizing a group of the half-toned sub-pages to form the make-up of a page to be printed, wherein the sub-pages do not overlap.

22 Claims, 6 Drawing Sheets

PAGE-MAKEUP SYSTEM

FIELD OF THE INVENTION

The invention relates to printing processes, and additionally to information representation techniques for a page to be printed.

BACKGROUND OF THE INVENTION

Information to be printed by a printer is arranged and collected by various software programs, and stored in the memory of a data-processing system for printing. There are basically two kinds of information to be printed, graphical images and textual information, both of which are normally represented in a digitized form.

Text is usually represented in a digitized coded form such as ASCII, while graphical images are usually represented in terms of pixel elements. A pixel, as well known in the art, may be represented by data bits which define the attributes of a screen pixel element. Pixel attributes may define pixel color and shade. An image usually consists of a group of pixels organized to form a pattern coherent to the human eye.

Pages to be printed may contain a combination of both images and text. A page may consist of one or more images and/or one or more textual "blocks" positioned in various locations on the page.

Existing printing techniques normally include three major stages.

In a first stage, namely a composition stage, information corresponding to a printed page is composed by an operator through various software programs which subsequently prepare a digitized form of the information to be printed. This digitized form, as described above for text and graphical images, is usually referred to in the art as a continuous-tone image. For each page, a continuous-tone image of the full page to be printed is prepared and stored in the memory of a data processing system for later conditioning prior to printing.

A second stage of the printing process, namely a half-toning stage, uses the continuous toned image as its input data, and produces information required to drive print heads, as the continuous tone image is not in a form readily usable by printers, as explained below.

Usually, each continuous-tone pixel can represent one of possibly thousands of colors and shades. However, most printers are limited to printing the colors of ink used. To print different colors, various techniques are used.

Colors are usually represented by "shades" of gray. Producing shades of a color, or "toning" as the process is often referred to in the art, is accomplished by printing a lower density of ink of the particular color. For example, in certain printers the color black may be produced by generating 360×360 dots per square inch, thereby covering the entire surface with black ink. However a lighter tone such as a given shade of gray is produced by generating 180×180 dots per square inch, whereby less than the entire surface is covered. Similarly, for other colors.

Most color printers only use 3 or 4 colors, namely cyan, magneta, yellow and perhaps black (hereinafter "process colors"), that "blend" together to produce a desired color. The process of color printing is complicated because generally shades of a process color are required to be combined to produce a desired color. So, toning is accomplished by printing a lower density of dots of each of the process colors. Thus, it is necessary that "bit-maps" be produced for each process color to inform the printing mechanism exactly how to print the process colors.

The mapping function is normally accomplished by a screen convertor apparatus that implements the half-toning process. Both hardware and software screen convertors are known.

Consequently, the output of the half-toning stage consists of a bit-mapped array representation of the page to be printed. The bit-mapped array functions as a control code array for print-heads. Normally, each bit commands a print head (there may be more than one) to either produce an toned dot (by thermal, ink jet, laser, impact or other means) or not.

In a third stage of the printing process, namely the physical printing of a page, actual printing occurs based on the bit-mapped array data. Usually, the bitmaps produced in the half-toning stage are put on film, or used to make plates for a printing press, or are transmitted directly to a printer such as a laser printer for printing.

Printing a page is not an instantaneous process. Normally there is a time lag (hereinafter "reaction time") between the receipt of a command to print the page and production of the physically printed page.

There are two major components to the reaction time.

A significant portion of the reaction time is due to the time needed to construct the continuous tone image of the full page to be printed from its constituent parts (namely images and textual blocks).

Another significant portion of the reaction time is caused by the half-toning stage needed to convert continuous-tone images to bit-mapped arrays required to control printers.

There are a number of production limitations with existing printing techniques. Existing printing techniques normally require the images that constitute the composition of a page to be printed to be physically ordered in memory when producing a new page, and also require a half-toning stage for each page to be printed. Consequently, there is a reaction time inherent in each new composition of a page to be printed. When numerous small batch jobs are to be printed, with each batch containing different page information, or with similar page information except for images arranged in variable positions on the page, the total production time can be dominated by the reaction time.

When producing voluminous quantities of pages using numerous short run, on demand batches, time is a significant factor in production runs. The reaction time-lags aggregate to cause a substantial delay in the production of pages.

SUMMARY OF THE INVENTION

The present invention seeks to reduce the time reaction delay that occurs with prior art printing techniques.

It is an object of the invention to allow for the production of voluminous quantities of pages using numerous short run batch jobs, each batch containing either fixed or variable graphical image or textual data, without significant detriment due to an aggregation of reaction time delays when a new page composition is to be printed.

Another object of the invention is directed toward information representation techniques for the composition of a page to be printed (hereinafter "page-makeup"). The invention allows for page-makeup to consist of an arbitrary combination of image, graphical or textual elements, arranged in various positions on pages to be printed.

In one aspect of the invention pages to be printed are constructed based on a combination of image graphical and/or textual elements (hereinafter "sub-pages") that are half-toned images, that is, sub-pages that already exist in bit-mapped array form. As explained more fully below, sub-pages constituting a page-makeup are collected from storage and organized in memory. The resulting full page bit map is then sent line by line, via a FIFO buffer, to a printer for printing. When an image is stored in half-toned form, time is saved by not having to transform the image from a continuous-tone image to a half-tone image every time the image is printed, as in the prior art. In this manner, the time required for half-toning during the printing process is avoided and the reaction time is reduced.

In a second aspect of the invention the page-makeup is represented by a control database wherein, as explained more fully below, the control database contains reference information wherein the make-up of a page is represented by pointers to pre-stored sub-pages, along with page positioning data for positioning the pre-stored sub-pages on the printed page.

In utilizing the control database with its inherent sub-page referencing scheme, it is not necessary to physically order the constituent sub-images in memory. Instead, sub-page positioning information is gathered (hereinafter "layout data"), which, along with associated address pointers to sub-pages in memory, contains complete information about the composition of a page. When printing a new page having sub-pages in common with a currently printed page, except for a difference in layout, no time consuming re-loading, ordering or half-toning of images is required, as in the prior art.

One use for the invention is in the printing of personalized take out menus and sales flyers. When printing these types of items, many pages have some sub-images in common, but possibly arranged in varying locations. Thus, by utilizing the invention, no time is lost by half-toning or by rearranging images for a new page composition.

A preferred embodiment of the invention makes use of a large number of graphical images and/or textual blocks (sub-pages) represented in bit-mapped array form (that is, half-tone images) that are previously stored in a memory of a data processing system.

Page-makeup consists of placement of a group of preferably non-overlapping sub-pages, preferably on a white background. Sub-pages may consist of graphical, image or textual blocks, or combinations of information type, but represented in bit-mapped array form suitable for printing. Sub-pages are further divided into lines for printing. Each sub-page is granted a unique identifier for reference purposes.

It should be noted that while sub-pages preferably do not overlap one another, two or more sub-pages may be placed side-by-side such that lines from sub-pages print on the same line of the page.

In a preferred embodiment of the invention, the process of printing a page is divided into two phases.

In a first pre-printing phase, a control database for each page to be printed is prepared.

It should be noted that two types of information are handled by the first phase. "Image data" includes information such as bit-mapped arrays that define a graphical image, and "control data" includes information such as sub-page positioning information.

In a preferred embodiment of the invention, there exists a pre-stored library of sub-pages as described above, preferably stored in secondary memory such as disk memory.

Layout, or positioning data is prepared for pages to be printed during a production run. Preferably, this layout preparation is accomplished by an operator before a production run begins. The layout information indicates where the sub-pages are to be located on pages to be printed. In a preferred embodiment of the invention, a layout command comprises a sub-page identifier, and, top offset and left offset (of the paper) information for the sub-page to be printed, such that there is no overlap between various sub-pages.

Next, sub-pages to be used during printing are loaded into an image memory. Preferably, the image memory is sufficiently large to hold all the sub-pages required during a production run. If there is insufficient memory to hold all the sub-pages, then sub-pages are switched in and out of memory so that those sub-pages required to be printed soon are loaded into memory at the expense of sub-pages not immediately required. The object is not to lose time loading sub-pages into memory.

For each sub-page loaded, its unique identifier, such as an address location, is stored in memory along with the length (in memory units) of the sub-page. Next, for each line in the sub-page, its left offset position and starting address and length in memory are stored.

A final step of the pre-printing phase is to prepare a control database suitable for printing. The database links sub-page layout information with addressing information, and functions as control information for the second printing phase. For example, if sub-page u is located at (x1,y1) and sub-page v is located at (x2,y2), with y2>y1, then the control database will contain a layout command for sub-page u followed by an address and length for each line in sub-page u, and then a layout command for sub-page v followed by an address and length for each line of sub-page v.

As another example, if sub-page u is located at (x1,y1) and sub-page v is located at (x2,y1), with x2>x1 such that there is no overlap between the sub-pages, then the control database will contain a layout command for sub-page u followed by a left offset and address and memory length for a first line in sub-page u, and then a layout command for sub-page v followed by a left offset position and address and memory length for a first line of sub-page v. The sub-pages' address and position alternating pattern continues for each line in sub-pages u and v (or at least until one sub-page is completely represented).

Thus, the page make-up method according to the present invention provides a plurality of uniquely identified sub-pages comprising half-toned images, in a memory; and organizes a group of the half-toned sub-pages to form the make-up of a page having a width and a length, to be printed with a printing process having a scan direction in the width direction, wherein the sub-pages do not overlap and wherein at least some of the sub-pages are placed side by side in the width direction.

In a second printing phase of a preferred embodiment of the invention, the sub-pages are physically printed by a printer utilizing the control database.

For each sub-page to be printed, its corresponding address information is read from the control database and the sub-page image data (that is, bit-mapped array data corresponding to a half-tone image) is read from the memory where it is stored. As the image data for each line of the sub-page is retrieved, the image data is stored in a FIFO buffer and delivered to a printer for printing.

It should be noted that concurrently with the printing of a sub-page, image data for another sub-page can and preferably is retrieved and stored in the FIFO buffer.

It should also be appreciated that in an alternative preferred embodiment of the invention, a control database for a page to be printed may be constructed while a prior page is being printed. It should be noted that the production process throughput is limited only by the speed of the printer itself and not by the speed of the half-tone device, or by the time required to organize a copy of the page in memory.

It should also be noted that by employing the method described, the inventors have found a significant time savings realized over prior art printing techniques when printing voluminous quantities of pages using numerous short run batches, particularly where many of the pages in the various batches contain images in common with one another.

BRIEF DESCRIPTION OF THE DRAWINGS

The present invention will be understood and appreciated more fully from the following detailed description, taken in conjunction with the following drawings in which.

DETAILED DESCRIPTION OF PREFERRED EMBODIMENTS

Figure 1:
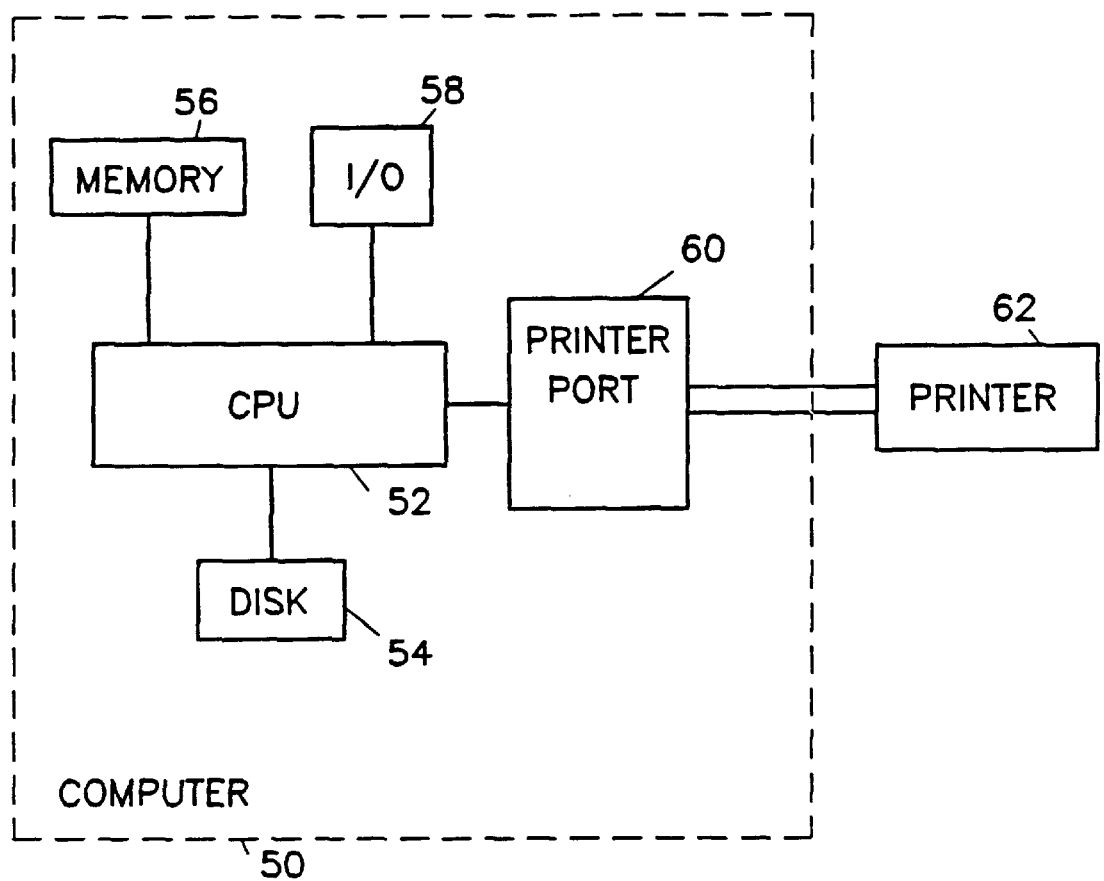
FIG. 1 is an illustration depicting a generalized representation of computer and printing hardware utilized in a preferred embodiment of the invention.

FIG. 1 depicts a generalized representation of apparatus utilized by the invention. A computer 50, including a CPU 52, local memory 56, secondary memory 54, and I/O resources 58, is connected to a printer 62 through a standard printer interface 60.

In a preferred embodiment of the invention, a data processing system embodying the processes of the invention functions as a component of an operating system used in computer 50.

Figure 2:
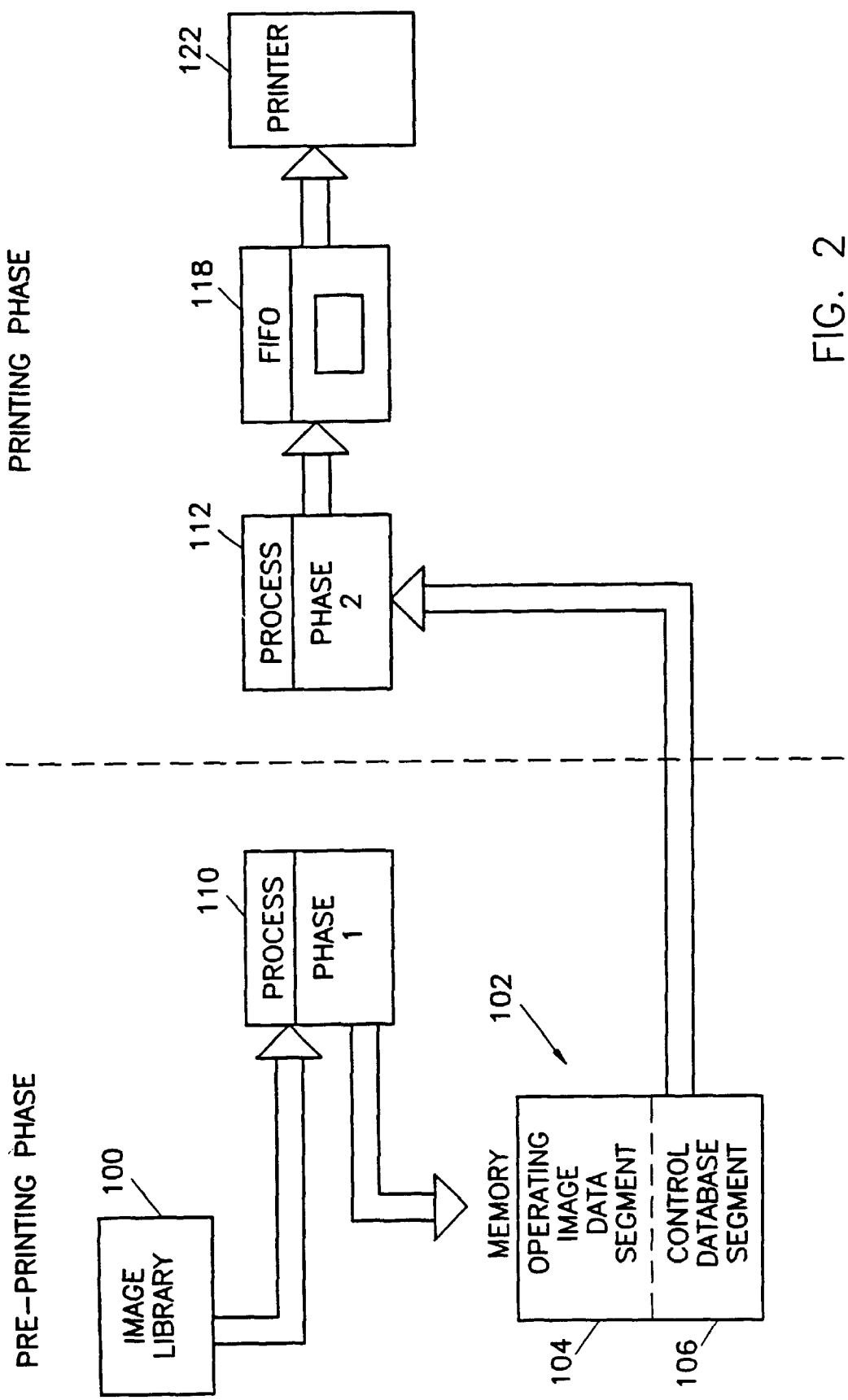
FIG. 2 is an overall system block diagram depicting the discrete steps of a preferred embodiment of the invention.

Referring additionally to FIG. 2, there is shown an overall system block diagram linking the discrete steps of the invention as well as some of the data objects with which the invention operates.

In a preferred embodiment of the invention, the process of printing a page is divided into two phases: a first pre-printing phase (embodied by a phase 1 process 110), and a second printing phase (embodied by a phase 2 process 112). In the pre-printing phase, a control database for each page to be printed is prepared, and in the printing phase, the page is physically printed.

Figure 3:
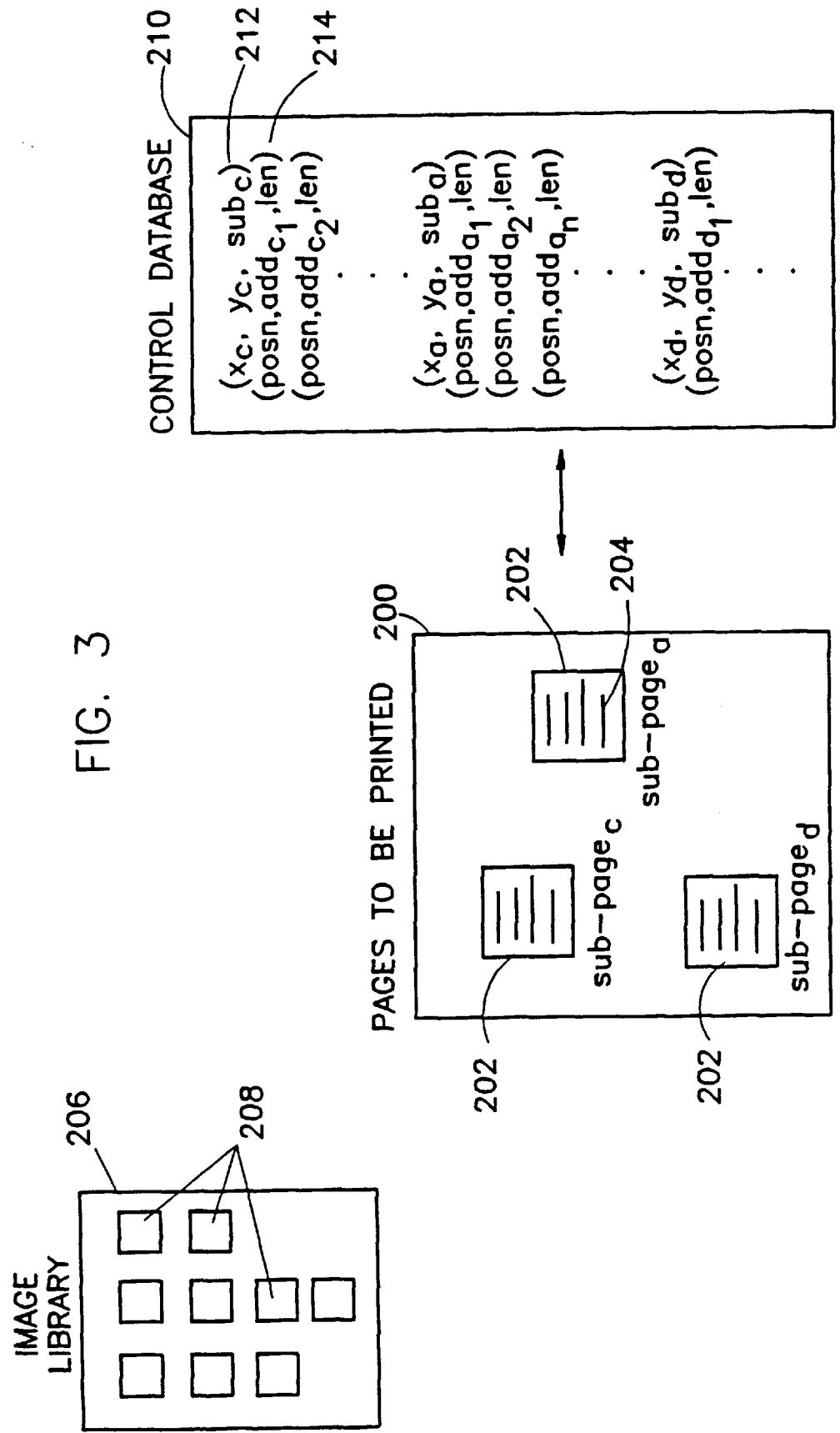
FIG. 3 is a representation of the structure of a page to be printed, including also a representation of a control database used to describe a page to be printed.

Before describing the steps of the printing process, it is necessary to describe the invention's information representation techniques for page-makeup, as illustrated in FIG. 3.

Referring additionally to FIG. 3, the make-up of a page to be printed 200 includes a group of sub-pages 202 that are arranged in various locations on the page, whose background color is white. Sub-pages 202 are arranged such that no two sub-pages overlap although it should be noted that sub-pages may share the same line of a page to be printed. Sub-pages 202 are preferably initially stored in an image library 206, and preferably a large number of commonly used sub-pages 208 are stored therein for repetitive use. Each sub-page 208 is granted a unique identifier and contains bit-mapped arrays representing a half-toned image. Sub-pages are further divided into lines 204 for printing.

For each page to be printed 200, a control database 210 is prepared in the pre-printing phase and utilized in the printing phase.

Control database 210 includes sub-page positioning information 212 that defines which sub-page 202 is to be printed and where on the page 200 it is to be printed. Control database 210 also includes left offset position information and address and memory length information 216 for each line 204 of a sub-page 202 to be printed.

Figure 4:
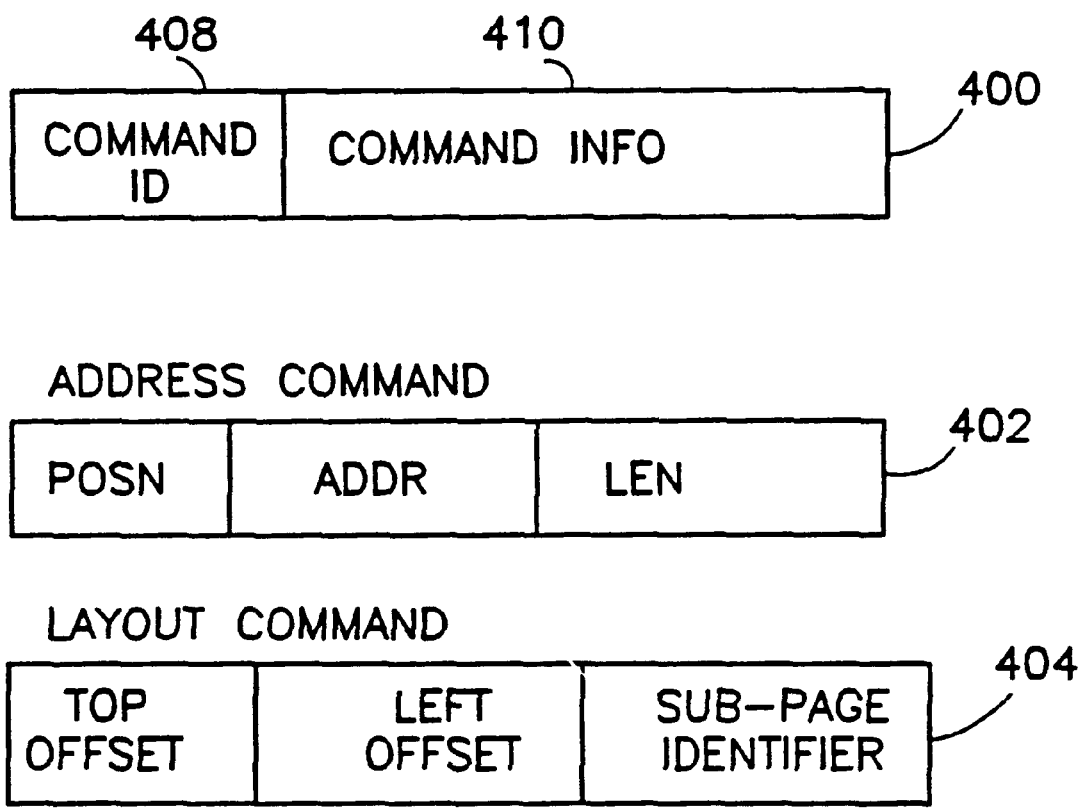
FIG. 4 is a representation of the structure of commands used in the control database of FIG. 3.

Referring additionally to FIG. 4, control database 210 includes a number of different commands in the database. An entry 400 in the database is preceded by a command identifier 408, and then by a command 410. Examples of commands include layout command 404 which comprises top and left offset positions as well as a sub-page identifier, and address command 402 which comprises left offset position information and a starting address in memory and memory length of image data.

Referring back to FIG. 2, there is shown an image library 100 (corresponding to 206), an image memory 102 which is preferably logically divided into two segments, an operating image data segment 104, and a control database segment 106. Pre-printing phase 1 process 110 constructs control database 210 utilizing sub-pages 208 and layout information supplied by an operator. Phase 1 process 110 also loads image data corresponding to sub-pages 208 used in page to be printed 200 to image memory 102.

Figure 5:
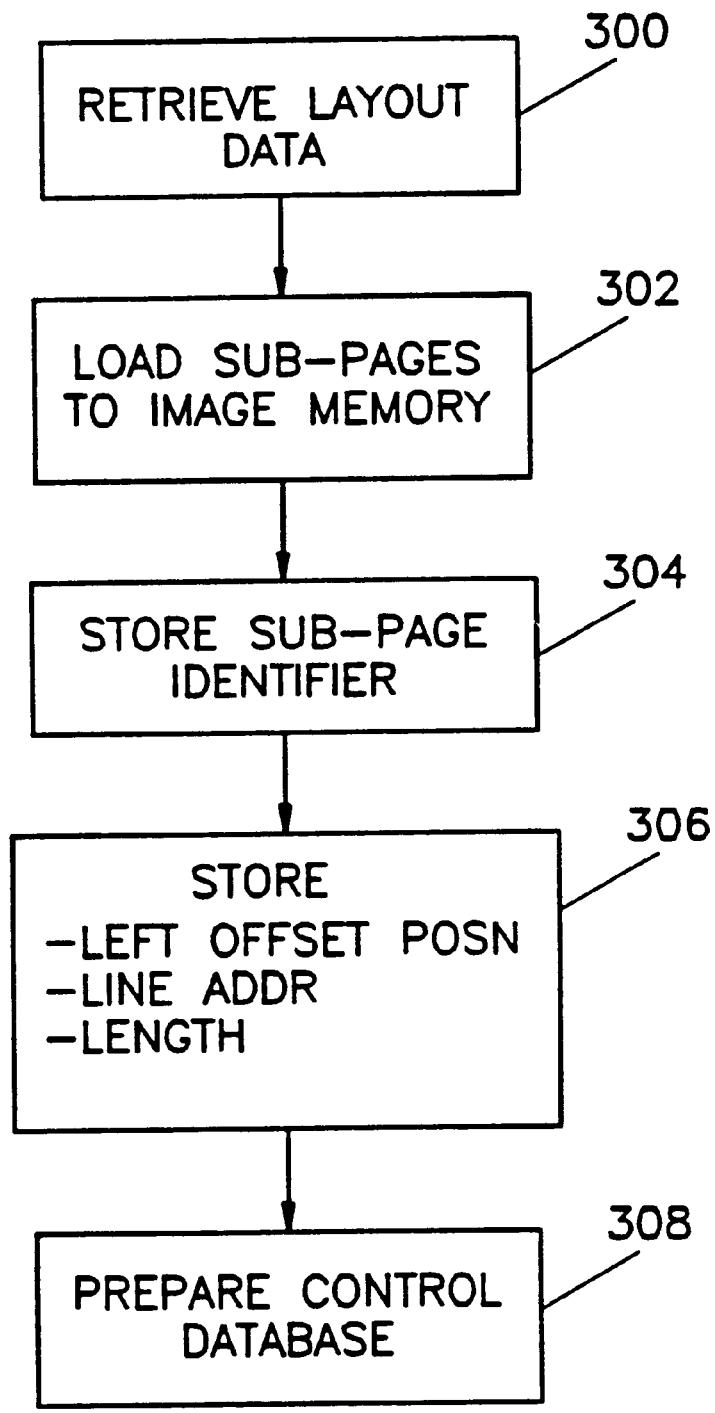
FIG. 5 is a flowchart diagram of a pre-printing, phase 1 process of the invention.

Referring additionally to FIG. 5, a flowchart for the steps of phase 1 process 110 is depicted. In a preferred embodiment of the present invention, an initial step 300 retrieves layout commands prepared by an operator. A second step 302 preferably loads all sub-pages 208 used in all the pages to be printed into image memory 102, preferably to operating image data segment 104. In an alternative embodiment of the present invention, if image memory 102 is insufficiently large to contain all sub-pages used during a production run, second step 302 manages image memory 102 by swapping sub-pages in and out of image memory 102 from image library 100, such that sub-page image data for a next page to be printed exists in memory (at the expense of sub-pages not immediately required). A third step 304 stores a unique sub-page identifier for each sub-page contained in image memory 102. A fourth step 306 stores left offset position data and a memory starting address and memory length for each line of each sub-page image data located in image memory 102. A fifth step 308 constructs control database 210 by sequentially ordering positioning and address information in the order lines of sub-pages are to be printed, and preferably stores control data-base 210 in control database segment 106 of image memory 102.

Referring back to FIG. 2, there is shown a FIFO buffer 118 and a printer 122. A printing phase 2 process 112 reads control database 210 from image memory 102 and retrieves sub-page image data preferably from operating image data segment 104 in image memory 102, or in an alternative embodiment of the present invention, from image library 100.

Figure 6:
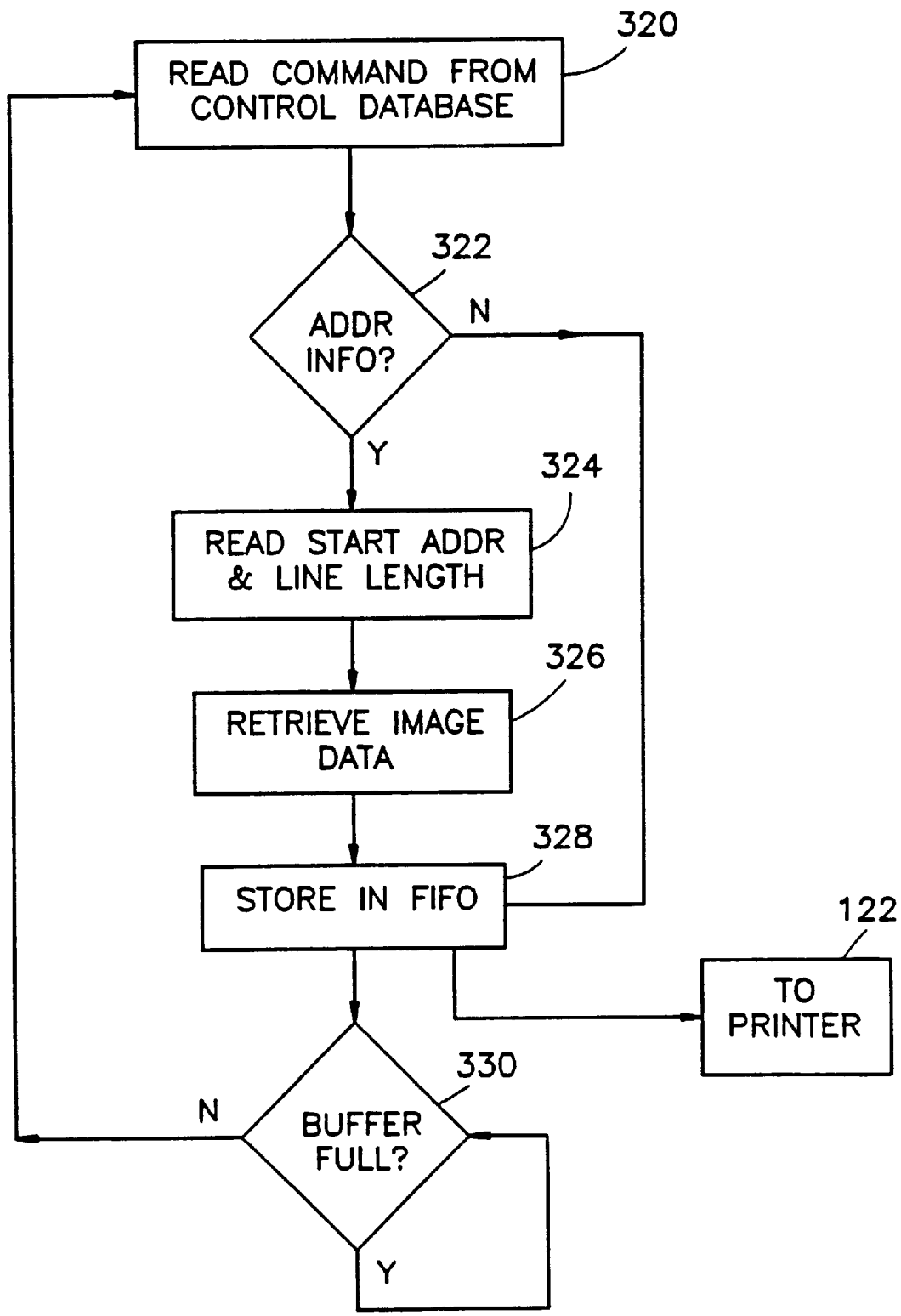
FIG. 6 is a flowchart diagram of a phase 2 process that occurs during printing.

Referring additionally to FIG. 6, a flowchart for the steps of phase 2 process 112 is depicted. In a preferred embodiment of the present invention, a first step 320 reads commands 400 from control database 210 located in control database memory segment 106. If the command includes addressing information, a second step 322 directs control to a third step 324, else control is passed to a fifth step 328. Third step 324 reads start address and line length information for sub-page lines. A fourth step 326 retrieves image data from operating image data segment 102 in image memory 102, or in an alternative embodiment of the present invention, from image library 100. Fifth step 328 stores commands or image data in FIFO buffer 118. A sixth step 330 checks if FIFO buffer 118 is full and passes control back to first step 320 if not.

Printer 122 reads bit-mapped array data representing half-toned images from FIFO buffer 120, as the buffer fills.

It should be noted that as phase 2 process 112 operates to fill FIFO buffer 118, printing may occur; and if a next sub-page is to be printed, its image data is transferred to FIFO buffer 118 while a current sub-page is being printed.

It should also be appreciated that in a preferred embodiment of the present invention, phase 1 process 110 may operate concurrently with phase 2 process 112, whereby, while a page is being printed by phase 2 process 112, new image data is loaded into image memory 102 and a next control database 210 is prepared by phase 1 process 110.

It should be noted that a bottleneck in the throughput of the printing process as preferably embodied by the present invention is in the amount of control data that can be produced during printing, and not in the amount of image data (half-toned images) that can be produced during printing, as in the prior art. This is generally not a problem.

It will be appreciated by persons skilled in the art that the present invention is not limited by what has been particularly shown and described herein. Rather, the scope of the present invention is defined only by the claims which follow:

I claim:

1. A page make-up method comprising:
    providing a plurality of uniquely identified sub-pages, comprising half-toned images, in a memory; and
    organizing a group of said half-toned sub-pages to form the make-up of a page to be printed, wherein the sub-pages do not overlap.

2. A method according to claim 1 wherein organizing sub-pages further comprises constructing a control database including addressing information and page positioning information for each of a group of said sub-pages used in the page to be printed.

3. A method according to claim 2 wherein constructing a control database comprises, for each page to be printed:
    retrieving a layout command wherein said layout command is responsive to positioning information on the placement of the various sub-pages on the page to be printed;
    providing a unique sub-page identifier for each sub-page used in said pages;
    loading image data corresponding to the sub-pages to memory;
    generating control information comprising top and left offset position information, memory starting address information and line length information for each sub-page; and
    generating control signals responsive to the control information wherein image addressing data are sequentially ordered according to the order of sub-pages to be printed by a print head of a printer.

4. A printing method comprising:
    composing a page according to claim 1; and
    retrieving image data corresponding to said page from memory and transmitting same to a printer for printing.

5. A printing method according to claim 4 wherein retrieving and transmitting image data comprises:
    (a) retreiving image data for each line of each sub-page used in printing a particular line of the page from memory;
    (b) storing the image data for each line in a FIFO buffer for subsequent printing by the printer; and
    (c) printing image data stored in the FIFO buffer for said line and concurrently repeating steps (a) and (b) if an additional line is to be printed.

6. A printing method according to claim 5 wherein retrieving line image data from memory comprises:
    (a) determining a memory starting address corresponding to a location in memory at which image data for said each line of each sub-page is located and a memory length from a control database also located in memory; and
    (b) retrieving image data coresponding to said line from memory beginning at said starting address until said memory length units have elapsed.

7. A method according to claim 1 in which one or more of the sub-pages is based on a continuous tone image.

8. A method according to claim 1 in which one or more of the sub-pages is a block of text.

9. A method according to claim 1 in which one or more of the sub-pages comprises graphical data.

10. A method according to claim 7 in which one or more of the sub-pages is a block of text.

11. A method according to claim 7 in which one or more of the sub-pages comprises graphical data.

12. A method according to claim 8 in which one or more of the sub-pages comprises graphical data.

13. A method according to claim 10 in which one or more of the sub-pages comprises graphical data.

14. A method according to claim 4 in which one or more of the sub-pages is based on a continuous tone image.

15. A method according to claim 4 in which one or more of the sub-pages is a block of text.

16. A method according to claim 4 in which one or more of the sub-pages comprises graphical data.

17. A method according to claim 14 in which one or more of the sub-pages is a block of text.

18. A method according to claim 14 in which one or more of the sub-pages comprises graphical data.

19. A method according to claim 15 in which one or more of the sub-pages comprises graphical data.

20. A method according to claim 16 in which one or more of the sub-pages comprises graphical data.

21. A page make-up method comprising:
    providing a plurality of uniquely identified sub-pages comprising half-toned images, in a memory; and
    organizing a group of said half-toned sub-pages to form the make-up of a page having a width and a length, to be printed with a printing process having a scan direction in the width direction, wherein the sub-pages do not overlap and wherein at least some of the sub-pages are placed side by side in the width direction.

22. A page make-up method comprising:
    providing a plurality of uniquely identified sub-pages comprising half-toned images, in a memory; and
    organizing a group of said half-toned sub-pages to form the make-up of a page to be printed, wherein the sub-pages do not overlap and at least two of said sub-pages are positioned side-by-side such that at least one line of each of said at least two of said sub-pages prints on the same line of the page.

* * * * *

UNITED STATES PATENT AND TRADEMARK OFFICE
CERTIFICATE OF CORRECTION

PATENT NO. : 5,900,003
DATED : May 4, 1999
INVENTOR(S) : Y. BEN DROR

It is certified that error appears in the above-identified patent and that said Letters Patent is hereby corrected as shown below:

At column 7, line 65 (claim 5, line 3) of the printed patent, "retreiving" should be ---retrieving---.

Signed and Sealed this

Twentieth Day of June, 2000

Attest:

Q. TODD DICKINSON

*Attesting Officer*　　　　　*Director of Patents and Trademarks*